R. E. STRAWN.
MARKING ATTACHMENT FOR PLANTERS.
APPLICATION FILED DEC. 29, 1915.
1,211,004.
Patented Jan. 2, 1917.
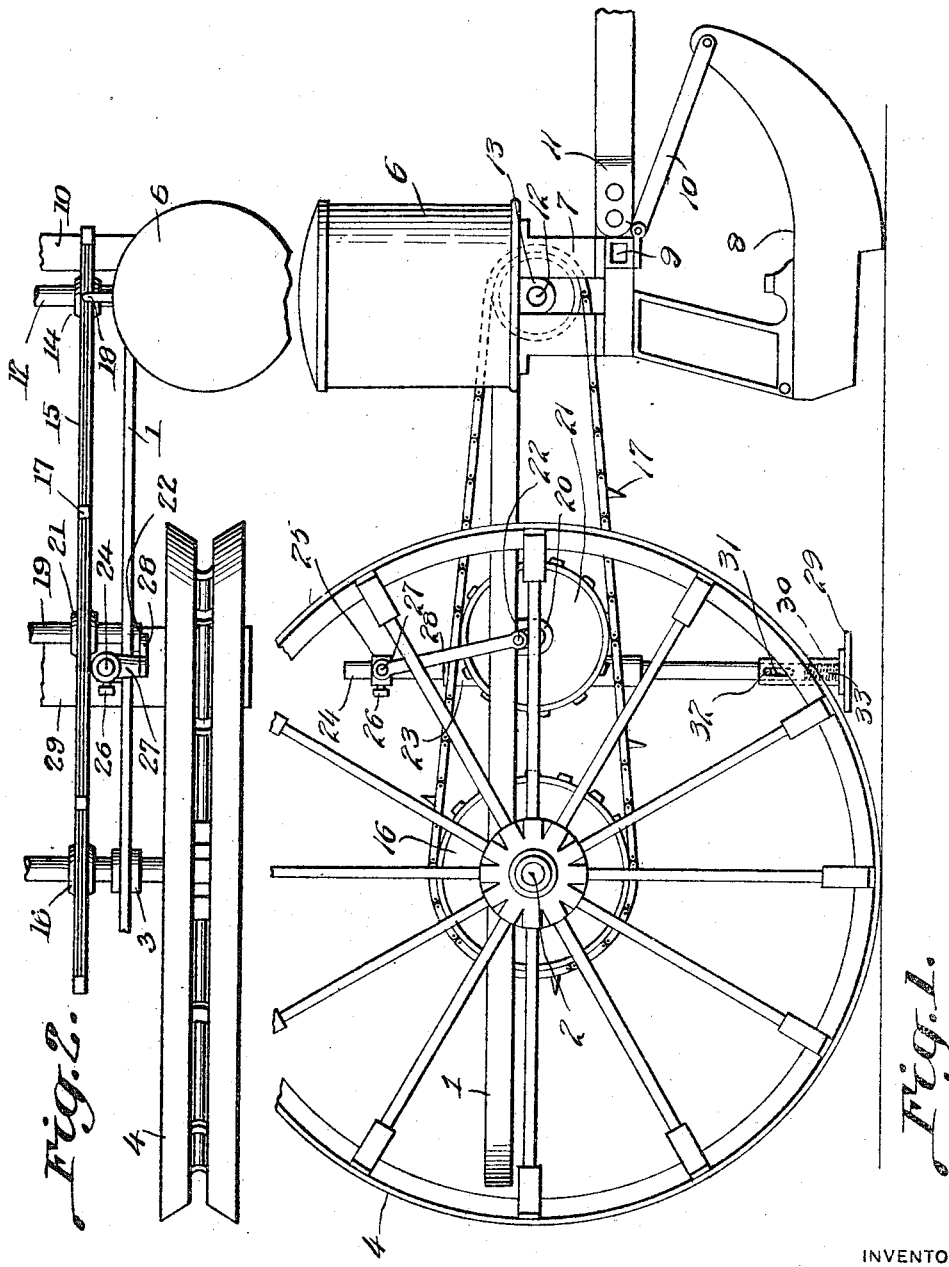
INVENTOR
Rudolph E. Strawn,
WITNESSES
BY
ATTORNEY

UNITED STATES PATENT OFFICE.

RUDOLPH E. STRAWN, OF LACON, ILLINOIS.

MARKING ATTACHMENT FOR PLANTERS.

1,211,004. Specification of Letters Patent. Patented Jan. 2, 1917.

Application filed December 29, 1915. Serial No. 69,208.

*To all whom it may concern:*

Be it known that I, RUDOLPH E. STRAWN, a citizen of the United States, residing at Lacon, in the county of Marshall and State of Illinois, have invented certain new and useful Improvements in Marking Attachments for Planters, of which the following is a specification.

My invention relates to planters of the check row type and more particularly to a land marking attachment therefor.

The primary object of my invention resides in the provision of novel means maintained on the frame and associated with the operating means for the said dispensing means for stamping the ground above the place where the seed has been deposited for marking the ground to enable the operator of the machine to efficiently plant the seed.

Another object of my invention resides in the provision of a novel resilient means for associating the stamping or marking head with the vertically movable plunger rods.

A further object of my invention resides in the provision of a novel means for adjusting the height of the plunger rods to consequently regulate the depth of the stamping head when in its lowermost position.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:—Figure 1 is a side elevation of my invention; and Fig. 2 is a top plan thereof, the shoes being removed.

Referring more particularly to the drawing in which similar reference numerals designate like or corresponding parts throughout the several views, I provide a frame 1 of preferably U-shaped configuration and having rotatably and transversely mounted thereon a shaft 2 in bearings 3 which depend from opposite points of the frame. Supporting wheels 4 are rigidly connected to the respective projecting ends of the axle shaft in arranged spaced relation with the sides of the frame. Seed hoppers 6 are connected to the sides of the frame adjacent the forward end thereof. Brackets 7 depend from the seed hoppers and have connected thereto shoes 8 the forward ends of which shoes are connected to a transverse cross piece 9 through the medium of links 10. The cross piece 9 is connected to the forward ends of the brackets 7 and has a tongue 11 connected thereto substantially intermediate its ends.

For the purpose of dispensing seed from the hoppers, I have provided my improved seed dispensing means. In the present instance I have rotatably and transversely mounted a shaft 12 in brackets 13 which depend from the sides of the frame adjacent the forward extremities thereof. Sprocket wheels 14 are rigidly connected to the shaft and arranged in closely spaced relation with the hoppers. Chains 15 are trained about the sprocket wheels 14 and also trained about large sprocket wheels 16 rigidly connected to the shaft 2 which are arranged in spaced relation to the inner sides of the frame. Cleats 17 are carried at uniformly spaced intervals by the chain and it is readily apparent that when the frame is being moved forward over the ground rotary movement will be imparted to the shaft 2 through the medium of the supporting wheels, said movement being incidentally imparted to the chain 15 to consequently cause the cleats 17 to strike the seed dispensing lever 18, associated with the hoppers. The seed released falls through the shoe and is deposited upon the ground at uniformly spaced intervals.

For the purpose of stamping the ground to facilitate the efficient planting of the seeds I have provided my improved stamping means for marking the ground to enable the operator to efficiently plant seed. In the present instance I have rotatably mounted a shaft 19 in brackets 20 which depend from the sides of the frame substantially intermediate the shafts 2 and 12. Sprocket wheels 21 are rigidly connected to shaft 19 and arranged in spaced relation with the sides thereof and incidentally arranged so as to be engaged by the chains 15 and consequently impart rotation to the shaft 19. The projecting ends of the shaft are cranked as indicated by the numeral 22 for the purpose to be described. Rigidly connected to the inner surface of the sides of the frame 1 and in close relation to the shaft 2 are vertically arranged guiding sleeves 23 having vertically movable plunger rods 24. The outer ends of these rods have adjustably mounted thereon collars 25, adjustment being maintained through the medium of set screws 26. Studs 27 project from the collars and each have pivotally connected thereto one end of the links 28, the opposite end of the links being pivotally connected to the cranks 22. As the sprocket causes the shaft 19 to rotate, the cranks 22 and the links 28 in connection with the rods 24 cause the latter to move vertically.

Associated with the lower ends of the plunger rods is my improved stamping and marking bar or head 29. Connection is maintained betwen the stamping bar and the rods through the medium of sleeves 30 carried adjacent the respective ends of the bar, said sleeves telescoping the lower ends of the rods and provided with slots 31 in which are slidably engaged pins 32 carried by the rods 24. Preparatory to the connection of the sleeves to the rods I have disposed my improved resilient means within the sleeves, in the present instance comprising coil springs 33 for absorbing the shocks transmitted to the stamping bar. It is to be understood that this bar is mounted so that it strikes the ground after each disposition of seed thereon by the seed dispensing means, care being taken in the arrangement of the cleats 17 on the chain and the diameter of the sprocket wheel 21 so that these parts may efficiently coact to produce the desired result.

The operation of my invention is as follows:—Assuming that the parts have been assembled in the manner described as the device is moved forwardly over a surface, rotary movement will be imparted to the sprocket wheels 16 on the axle shaft through the medium of the supporting wheels. This rotary movement is incidentally imparted to the sprocket wheels 21 and 14, the chain moving about the sprocket wheel causes the cleats to strike the seed dispensing levers at predetermined periods to consequently deposit seed in uniformly spaced relation on the ground. Simultaneous with this movement the crank ends 22 of the shaft 19 rotate because of the sprocket wheels 21 and because of the links 28 the plunger rods 24 will be moved vertically causing the stamping bar 29 to strike the ground above the place where the seed has been deposited consequently facilitating the efficient planting of the seed. The coil springs absorb all shocks transmitted to the bar 29 when it strikes the ground.

Although I have shown and described the preferred embodiment of my invention I desire it to be understood that I am not to be limited to the exact details shown, however, I desire that great stress be laid upon the arrangement of the novel stamping means for operating simultaneously with the seed dispensing means for stamping the ground above the place where seed has been previously deposited for consequently facilitating the efficient planting of the seed.

From the above description taken in connection with the accompanying drawings it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. A land marking attachment for planters including a stamping bar, slotted sleeves carried by the upper surface of the bar adjacent the respective ends thereof, vertically movable plunger rods the lower ends of which are arranged in the sleeves, means carried by the rods and engaging the slots in the sleeves for establishing a slidable connection therebetween, shock absorbing means arranged in the sleeves between the rods and the bar, means for adjusting the movement of the rods, and means for moving the rods simultaneously with the seed dispensing means of the planter.

2. A check row planter including a frame, seed dispensing means thereon, a chain operatively mounted on the frame, means on the chain for actuating the seed dispensing means at predetermined periods, a rotatably mounted shaft in the frame, cranks formed upon the projecting ends of the shaft, sprocket wheels carried by the shaft for engaging the chain to consequently rotate the shaft, links pivotally connected to the cranks, vertically slidable stamping means for engaging the ground at predetermined periods above the place where seed has been deposited for efficiently planting the seed, and means for adjustably connecting the links to the vertically movable stamping means to vary the height of the stamping means.

In testimony whereof I affix my signature in presence of two witnesses.

RUDOLPH E. STRAWN.

Witnesses:
W. H. FORD,
J. W. SHORES.

Copies of this patent may be obtained for five cents each, by addressing the "Commissioner of Patents, Washington, D. C."